(12) United States Patent
Guillerm et al.

(10) Patent No.: US 9,886,413 B2
(45) Date of Patent: Feb. 6, 2018

(54) DISPLAYPORT OVER USB MECHANICAL INTERFACE

(71) Applicant: NXP B. V., Eindhoven (NL)

(72) Inventors: Nicolas Guillerm, Villons les Buissons (FR); Krishnan Tiruchi Natarajan, Cupertino, CA (US)

(73) Assignee: NXP B.V., Eindhoven (NL)

( * ) Notice: Subject to any disclaimer, the term of this patent is extended or adjusted under 35 U.S.C. 154(b) by 173 days.

(21) Appl. No.: 14/011,958

(22) Filed: Aug. 28, 2013

(65) Prior Publication Data
US 2016/0147704 A1    May 26, 2016

(30) Foreign Application Priority Data

Sep. 21, 2012 (EP) .................................. 12290313

(51) Int. Cl.
*G06F 13/42*    (2006.01)
*G06F 13/40*    (2006.01)

(52) U.S. Cl.
CPC ........ *G06F 13/4282* (2013.01); *G06F 13/409* (2013.01); *G06F 13/4068* (2013.01)

(58) Field of Classification Search
CPC ............... G06F 13/385; G06F 13/4068; G06F 13/4282; G06F 2213/0042
See application file for complete search history.

(56) References Cited

U.S. PATENT DOCUMENTS

| | | | | |
|---|---|---|---|---|
| 7,788,428 B2* | 8/2010 | Melin | .................... | G09G 5/006 710/305 |
| 7,865,629 B1* | 1/2011 | Tantos | .................. | G06F 13/385 710/11 |
| 8,151,018 B2* | 4/2012 | Mohanty | ............... | G06F 13/385 710/38 |
| 8,237,624 B2* | 8/2012 | Zeng | ..................... | G06F 3/1431 345/1.1 |
| 8,255,576 B2* | 8/2012 | Siulinski | ............. | H04L 12/2803 710/15 |
| 8,312,302 B2* | 11/2012 | Baker | ..................... | G06F 1/266 713/300 |
| 8,489,781 B1* | 7/2013 | An | ....................... | G06F 13/4295 320/137 |

(Continued)

FOREIGN PATENT DOCUMENTS

WO    2011/130026 A2    10/2011

OTHER PUBLICATIONS

Universal Serial Bus 3.0 Specification, Revision 1.0 (Jun. 6, 2011).
(Continued)

*Primary Examiner* — Brian Misiura (57) ABSTRACT

Various exemplary embodiments relate to a function selector device in a system using a DisplayPort protocol over a universal serial bus (USB) mechanical interface, including: a first port configured to transmit/receive a USB SSTX signal; a second port configured to transmit/receive a USB SSRX signal; a third port configured to transmit/receive a DisplayPort lane signal; a fourth port configured to transmit/receive a DisplayPort AUX signal; a fifth port configured to transmit/receive a DisplayPort HPD signal; a sixth port configured to connect to SSTX pins of a USB 3.0 receptacle; and a seventh port configured to connect to SSRX pins of a USB 3.0 receptacle.

10 Claims, 11 Drawing Sheets

(56) References Cited

U.S. PATENT DOCUMENTS

| | | | | |
|---|---|---|---|---|
| 8,615,611 B2* | 12/2013 | Hall | ................ | G06F 13/385 |
| | | | | 710/66 |
| 8,806,094 B2* | 8/2014 | Mohanty | ............... | G06F 13/385 |
| | | | | 710/62 |
| 8,823,403 B2* | 9/2014 | Li | ............... | G01R 1/28 |
| | | | | 324/538 |
| 9,112,327 B2* | 8/2015 | Sarwar | ................ | H01R 24/60 |
| 9,252,970 B2* | 2/2016 | Chandra | ............ | H04L 12/4625 |
| 9,378,110 B2* | 6/2016 | Miyaoka | ............ | G06F 11/3041 |
| 2009/0248918 A1 | 10/2009 | Diab et al. | | |
| 2010/0183004 A1 | 7/2010 | Kobayashi | | |
| 2013/0217274 A1* | 8/2013 | Bar-Niv | ................ | H01R 27/02 |
| | | | | 439/676 |
| 2016/0110305 A1* | 4/2016 | Hundal | ............... | G06F 13/4022 |
| | | | | 710/316 |
| 2016/0112711 A1* | 4/2016 | Hundal | ............... | G06F 13/4282 |
| | | | | 375/240.26 |
| 2016/0127671 A1* | 5/2016 | Hundal | ................ | H04N 5/38 |
| | | | | 348/723 |

OTHER PUBLICATIONS

VESA DisplayPort Specification, Version 1.2a (Mar. 2012).
Extended European Search Report for application No. EP 12290313.1 (dated Mar. 13, 2011).

* cited by examiner

USB 3.0 STANDARD-A RECEPTACLE PIN ASSIGNMENTS

| PIN NUMBER | SIGNAL NAME | | |
|---|---|---|---|
| | IN SuperSpeed MODE | IN COMBO MODE (DisplayPort SOURCE) | IN COMBO MODE (DisplayPort SINK) |
| 1 | VBUS | | |
| 2 | D− | | |
| 3 | D+ | | |
| 4 | GND | | |
| 5 | StdA_SSRX− | CAUX− | CD− |
| 6 | StdA_SSRX+ / INCOMING SIGNAL VCM LOW | CAUX+ / BIDIR. SIGNAL VCM HIGH | CD+ / INCOMING SIGNAL VCM HIGH |
| 7 | GND_DRAIN | | |
| 8 | StdA_SSTX− | CD− | CAUX− |
| 9 | StdA_SSTX− / OUTGOING SIGNAL VCM LOW | CD+ / OUTGOING SIGNAL VCM HIGH | CAUX+ / BIDIR. SIGNAL VCM HIGH |
| SHELL | SHIELD | | |

FIG. 7

USB 3.0 STANDARD-B RECEPTACLE PIN ASSIGNMENTS

| PIN NUMBER | SIGNAL NAME | | |
|---|---|---|---|
| | IN SuperSpeed MODE | IN COMBO MODE (DisplayPort SOURCE) | IN COMBO MODE (DisplayPort SINK) |
| 1 | | VBUS | |
| 2 | | D- | |
| 3 | | D+ | |
| 4 | | GND | |
| 5 | StdB_SSTX- | CD- | OUTGOING SIGNAL VCM HIGH | CAUX- | CAUX+ |
| 6 | StdB_SSTX+ | CD+ | | |
| 7 | | GND_DRAIN | |
| 8 | StdB_SSRX- | CAUX- | BIDIR. SIGNAL VCM HIGH | CD- | CD+ |
| 9 | StdB_SSRX+ | CAUX+ | | |
| SHELL | | SHIELD | |

FIG. 8

USB 3.0 POWERED-B RECEPTACLE PIN ASSIGNMENTS

| PIN NUMBER | SIGNAL NAME | | |
|---|---|---|---|
| | IN SuperSpeed MODE | IN COMBO MODE (DisplayPort SOURCE) | IN COMBO MODE (DisplayPort SINK) |
| 1 | VBUS | | |
| 2 | D- | | |
| 3 | D+ | | |
| 4 | GND | | |
| 5 | StdB_SSTX- / OUTGOING SIGNAL VCM LOW | CD- / OUTGOING SIGNAL VCM HIGH | CAUX- / BiDIR. SIGNAL VCM HIGH |
| 6 | StdB_SSTX+ | CD+ | CAUX+ |
| 7 | GND_DRAIN | | |
| 8 | StdB_SSRX- / INCOMING SIGNAL VCM LOW | CAUX- / BiDIR. SIGNAL VCM HIGH | CD- / INCOMING SIGNAL VCM HIGH |
| 9 | StdB_SSRX+ | CAUX+ | CD+ |
| 10 | DPWR | | |
| 11 | DGND | | |
| SHELL | SHIELD | | |

FIG. 9

USB 3.0 MICRO-B RECEPTACLE PIN ASSIGNMENTS

| PIN NUMBER | SIGNAL NAME | | |
|---|---|---|---|
| | IN SuperSpeed MODE | IN COMBO MODE (DisplayPort SOURCE) | IN COMBO MODE (DisplayPort SINK) |
| 1 | VBUS | | |
| 2 | D- | | |
| 3 | D+ | | |
| 4 | ID | | |
| 5 | GND | | |
| 6 | MicB_SSTX- | CD- | CAUX- |
| 7 | MicB_SSTX+ OUTGOING SIGNAL VCM LOW | CD+ OUTGOING SIGNAL VCM HIGH | CAUX+ BIDIR. SIGNAL VCM HIGH |
| 8 | GND_DRAIN | | |
| 9 | MicB_SSRX- | CAUX- | CD- |
| 10 | MicB_SSRX+ INCOMING SIGNAL VCM LOW | CAUX+ BIDIR. SIGNAL VCM HIGH | CD+ INCOMING SIGNAL VCM HIGH |
| SHELL | SHIELD | | |

FIG. 10

USB 3.0 MICRO-AB RECEPTACLE PIN ASSIGNMENTS

| PIN NUMBER | SIGNAL NAME | | |
|---|---|---|---|
| | IN SuperSpeed MODE | IN COMBO MODE (DisplayPort SOURCE) | IN COMBO MODE (DisplayPort SINK) |
| 1 | VBUS | | |
| 2 | D- | | |
| 3 | D+ | | |
| 4 | ID | | |
| 5 | GND | | |
| 6 | MicA_SSRX- INCOMING SIGNAL VCM LOW | CAUX- | CD- |
| 7 | MicA_SSRX+ | CAUX+ BIDIR. SIGNAL VCM HIGH | CD+ INCOMING SIGNAL VCM HIGH |
| 8 | GND_DRAIN | | |
| 9 | MicA_SSTX- OUTGOING SIGNAL VCM LOW | CD- | CAUX- |
| 10 | MicA_SSTX- | CD+ OUTGOING SIGNAL VCM HIGH | CAUX+ BIDIR. SIGNAL VCM HIGH |
| SHELL | SHIELD | | |

FIG. 11

DISPLAYPORT OVER USB MECHANICAL INTERFACE

CROSS-REFERENCE TO RELATED APPLICATIONS

This application claims the priority under 35 U.S.C. §119 of European patent application no. 12290313.1, filed on Sep. 1, 2012, the contents of which are incorporated by reference herein.

FIELD OF THE INVENTION

Various exemplary embodiments disclosed herein relate generally to an apparatus and method for transmitting a DisplayPort signal over a USB mechanical interface.

BACKGROUND OF THE INVENTION

Universal serial bus (USB) is finding wide use in mobile devices. The USB provides both data and power to mobile devices. USB is not specifically designed for transmitting audio visual information. DisplayPort is a display interface whose primary use is to connect a video source to a display. Because DisplayPort is a high bandwidth interface, it may carry high resolution video at high framerates. Because many mobile devices also may output video to an external display, it may become necessary to include both a USB and DisplayPort interface to provide a mobile device with power, data connectivity, and high quality display output. As mobile devices shrink in size, including both ports becomes difficult.

SUMMARY OF THE INVENTION

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a function selector device in a system using a DisplayPort protocol over a universal serial bus (USB) mechanical interface, including: a first port configured to transmit/receive a USB SSTX signal; a second port configured to transmit/receive a USB SSRX signal; a third port configured to transmit/receive a DisplayPort lane signal; a fourth port configured to transmit/receive a DisplayPort AUX signal; a fifth port configured to transmit/receive a DisplayPort HPD signal; a sixth port configured to connect to SSTX pins of a USB 3.0 receptacle; and a seventh port configured to connect to SSRX pins of a USB 3.0 receptacle.

Various exemplary embodiments relate to a method of transmitting a SuperSpeed protocol over a universal serial bus (USB) mechanical interface using a function selector, including: receiving a USB SSTX signal at a USB SSTX port; determining that the voltage at the SSTX receptacle port is below a detection threshold; connecting the USB SSTX port to a SSTX receptacle port connected to a SSTX connector of a USB receptacle; and connecting a USB SSRX port that receives a USB SSRX signal to a SSRX receptacle port connected to a SSRX connector of a USB receptacle.

Various exemplary embodiments relate to a method of receiving a DisplayPort protocol over a universal serial bus (USB) mechanical interface using a function selector, including: receiving a USB SSTX signal at a USB SSTX port; determining that the voltage at the USB SSTX port is above a detection threshold; connecting a DisplayPort lane port that receives a DisplayPort lane signal to a SSTX receptacle port connected to a SSTX connector of a USB receptacle; and connecting a AUX port that receives a DisplayPort AUX signal to a SSRX receptacle port connected to a SSRX connector of a USB receptacle.

Various exemplary embodiments relate to a method of receiving a SuperSpeed protocol over a universal serial bus (USB) mechanical interface using a function selector, including: receiving a DisplayPort HPD signal at a HPD port; determining that the voltage at the HPD port is below a hot plug detection threshold; connecting a USB SSTX port that receives a USB SSTX signal to a SSTX receptacle port connected to a SSTX connector of a USB receptacle; and connecting a USB SSRX port that receives a USB SSRX signal to a SSRX receptacle port connected to a SSRX connector of a USB receptacle.

Various exemplary embodiments relate to a method of transmitting a DisplayPort protocol over a universal serial bus (USB) mechanical interface using a function selector, including: receiving a DisplayPort HPD signal at a HPD port; determining that the voltage at the HPD port is above a hot plug detection threshold; connecting a DisplayPort lane port that receives a DisplayPort lane signal to a SSTX receptacle port connected to a SSTX connector of a USB receptacle; connecting a AUX port that receives a DisplayPort AUX signal to a SSRX receptacle port connected to a SSRX connector of a USB receptacle; and connecting a HPD port that receives a DisplayPort HPD signal to the SSRX receptacle port.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION OF THE EMBODIMENTS

Embodiments are described below that use a USB 3.0 connector to provide both USB and DisplayPort functions in an application to reduce the number of different receptacles to implement on the device.

If a mobile device provides video out, it may include both a USB port and a DisplayPort. These dual connections have multiple drawbacks. The space available on the mobile device (for example, smartphone, tablet, etc.) may be limited. Each connector may be quite expensive. The mini DisplayPort connector that may be used may be too tall for mobile devices. The USB connector may be defined as a universal power charging port so the customer needs to use it to supply power to its mobile device. The Mini DisplayPort connector does not support supplying power, so the customer may need a USB cable to supply power to its mobile device. Accordingly, DisplayPort communication may be accomplished using a USB 3.0 connection. The device may also automatically detect the function (USB or DisplayPort) of the attached device on the shared connector to enable the appropriate feature.

Figure 1:
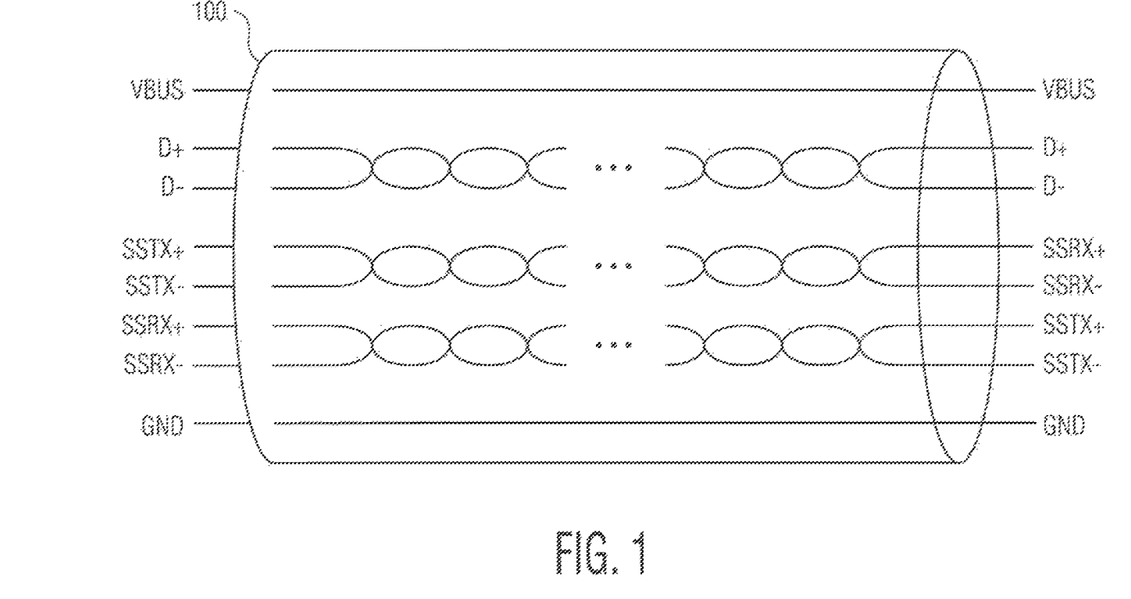
FIG. 1 is a schematic diagram of a USB 3.0 cable.

FIG. 1 is a schematic diagram of a USB 3.0 cable. USB 3.0 may use up to three differential pairs and a power line. Power may be supplied using the VBUS and GND lines. The D+/D− differential pair provides bidirectional communication using the USB 2.0 protocol. Differential pair SSTX+/SSTX− provides for SuperSpeed data transmission. Differential pair SSRX+/SSRX− provides for SuperSpeed data reception.

Figure 2:
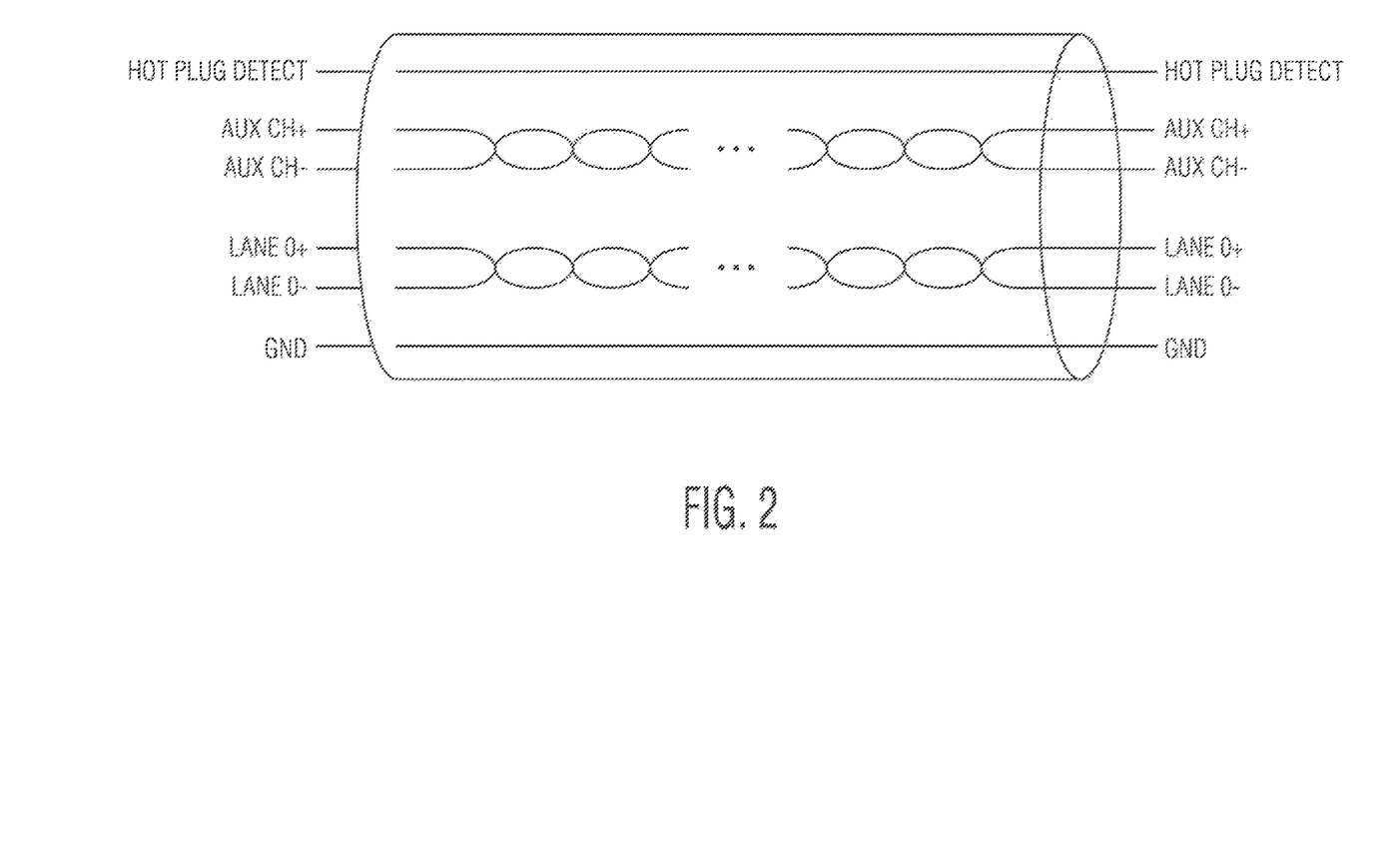
FIG. 2 is a schematic diagram of a DisplayPort cable.

FIG. 2 is a schematic diagram of a DisplayPort cable. DisplayPort may use one, two or four differential pairs for data lanes. In FIG. 2 only a single lane Lane 0 is illustrated. Further, the DisplayPort cable may include one differential pair AUX CH+/AUX CH− for an auxiliary channel and a hot plug detect line HPD. DisplayPort with one high speed lane up to 5.4 Gbit/s may transport a single video stream of 1920×1200 at 60 Hz with 24 bits per pixel or a combination of two video streams, e.g., 1600×900 60 Hz 24 bpp and 1280×768 60 Hz 24 bpp.

While the cable structure of the USB 3.0 cable and the DisplayPort may be similar, the electrical characteristics and the protocols are different. The bitrate of the USB SuperSpeed differential pair and DisplayPort lane differential pair are close: 5 Gb/s for SuperSpeed and 5.4 Gb/s for a DisplayPort lane. But due to the electrical and protocol differences between USB SuperSpeed and DisplayPort, a device with both USB SuperSpeed and DisplayPort functions may require two different connectors, one per function, or a proprietary connector with dedicated pins for each function. Though USB may also be used to support video using vendor or Audio-Video specific scheme, it is not primarily intended to replace DisplayPort or HDMI which are dedicated interfaces for Audio Video transport.

For example, a smartphone may include dual functions as follows: sharing files with a PC via USB where the USB may also connect to a peripheral item and charge the smartphone battery; and displaying audio/video content using DisplayPort on an external screen using a media player. But the smartphone may not have enough space to have two different connectors. Accordingly the embodiments described below disclose using a single USB 3.0 connector where the SuperSpeed pins are reused for DisplayPort transmission. Adding this additional capability onto the USB connector of platforms may permit various computing and consumer products to implement both USB 3.0 and DisplayPort connectivity over a USB 3.0 connection.

Figure 3:
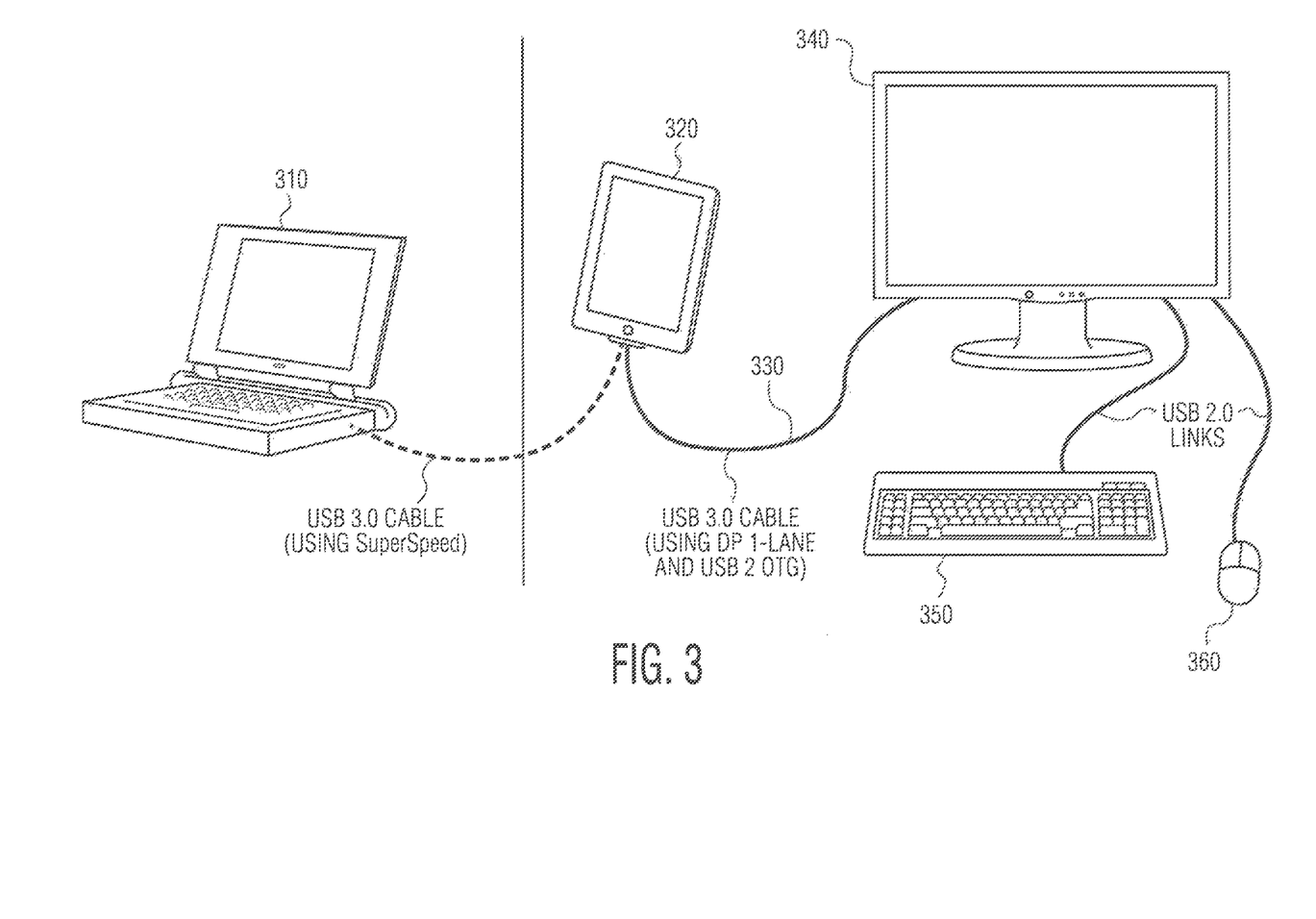
FIG. 3 illustrates a system using a USB connection for both USB and DisplayPort connections.

FIG. 3 illustrates a system using a USB connection for both USB and DisplayPort connections. Initially a laptop 310 may be connected to a tablet 320 using a USB 3.0 cable 330. The laptop 310 and tablet 320 may exchange data over the USB 3.0 cable 330 as well as the laptop 310 providing power to the tablet 320. The USB 3.0 cable 330 may then be disconnected from the laptop 310 and connected to a display 340. The tablet 320 may now transmit display information to the display 340 using a DisplayPort protocol over the USB 3.0 cable 330. Further, the display 340 may be connected to a keyboard 350 and a mouse 360 using a USB 2.0 links. Inputs from the keyboard 350 and the mouse 360 may also be transmitted by the display 340 to the tablet 320 using USB 2.0 across the USB 3.0 cable 330. Therefore, both DisplayPort data and USB 2.0 data may be transmitted over the USB 3.0 cable 330 at the same time. Also the display 340 may provide power to the tablet 320 across the USB 3.0 cable 330.

Figure 4:
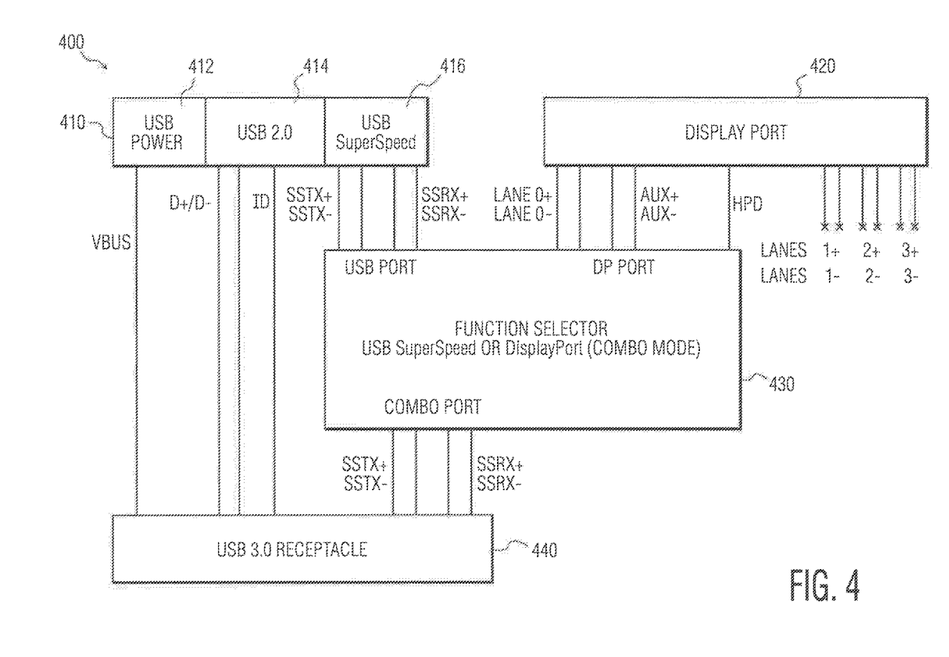
FIG. 4 illustrates a system that implements both a USB 3.0 and DisplayPort protocol over a USB 3.0 connection.

FIG. 4 illustrates a system that implements both a USB 3.0 and DisplayPort protocol over a USB 3.0 connection. The system 400 may include a USB controller 410, a DisplayPort controller 420, a function selector 430, and a USB 3.0 receptacle 440.

The USB controller may include a USB power supply 412, a USB 2.0 controller 414, and a USB SuperSpeed controller 416. The USB power supply 412 implements a standard USB power supply for supplying power over the VBUS line to devices connected to the USB 3.0 receptacle 330 or the USB power supply 412 may charge the battery in device using power from the USB receptacle 440. The USB 2.0 controller 414 implements USB 2.0 using the differential pair of lines D+/D−. Further, the USB 2.0 controller 414 may control an identification line ID. The USB SuperSpeed controller 416 may include two differential pairs of lines SSTX+/SSTX− and SSRX+/SSRX−. One pair SSTX+/SSTX− may be for transmitting data and the other pair SSRX+/SSRX− may be for receiving data.

The DisplayPort controller 420 may include a differential pair of lines Lane 0+/Lane 0− that may provide high speed communication of audio/video data. The DisplayPort controller 420 may also include another differential pair of lines AUX+/AUX−. The AUX channel may be used to transmit and receive commands, identification information, or other data. The DisplayPort controller 420 may also include a hot plug detect (HPD) line. The HPD line may be used to indicate that the DisplayPort controller is active and attempting to communicate over the DisplayPort channel. The DisplayPort controller may include other lanes made up of differential pairs of lines, but they are not used to communicate in the present embodiment.

The USB 3.0 receptacle 440 may be a standard USB 3.0 receptacle. The VBUS, D+/D−, and ID lines may be connected to the USB controller 410. The SSTX/SSTX− and SSRX+/SSRX− lines may be connected to the function selector 430. The function selector 430 may include a USB port, a DP port, and a Combo port. The USB port may be connected to the USB SuperSpeed controller 416 via the differential line pairs SSTX+/SSTX− and SSRX+/SSRX−. The DP port may be connected to the DisplayPort controller 420 via the differential line pairs Lane 0+/Lane 0− and AUX+/AUX− and the HPD line. The Combo port may be connected to the USB 3.0 receptacle via the differential line pairs SSTX+/SSTX− and SSRX+/SSRX−.

The system 400 may be resident in any device that may desire to implement both a USB 3.0 and DisplayPort connections via a USB 3.0 connection. Mobile phones, tablets, PDA's, music players, video players, mobile devices in general, etc. may include system 400 in order to save scarce space by using only a USB 3.0 receptacle for both USB 3.0 and DisplayPort communications. The function selector operates to select either the USB SuperSpeed channel or the DisplayPort Lane 0 channel for output on the Combo port via the SSTX/SSRX lines. Further. USB 2.0 or lower USB traffic may be communicated using the USB 2.0 controller 414 and D+/D− lines at the same time that DisplayPort traffic may be communicated using the SSTX/SSRX lines.

On the SuperSpeed differential pairs between the two function selectors (i.e., one in the DisplayPort source and one in the DisplayPort sink), the DisplayPort main link Lane 0+/Lane 0− may be mixed with the mode selection signal. Therefore, the differential pair corresponding of the main link lane may be referred to as the Combo data lane (CD+ and CD− signals).

On the SuperSpeed differential pairs between the two function selectors (i.e., one in the DisplayPort source and one in the DisplayPort sink); the DisplayPort auxiliary channel AUX+/AUX− and HPD may be mixed together. Therefore, the differential pair corresponding of AUX/HPD will be named Combo AUX (CAUX+ and CAUX− signals).

The function selector 430 may generate electrical signals according the USB SuperSpeed specification to be directly connected to the USB SuperSpeed controller 416. When the DisplayPort function is connected to the receptacle (i.e., Combo mode), the USB SuperSpeed port of Function Selector may be in an inactive mode.

The function selector 430 may generate electrical signals according the DisplayPort specification to be directly connected to the DisplayPort controller 420. When the USB SuperSpeed function is connected to the receptacle, the DisplayPort port of function selector 430 may be in an unattached mode.

The SSTX differential pair of the USB port of the Function Selector may be an input and the SSRX differential pair of the USB port of the Function Selector may be an output. The AUX differential pair of the DP port of the function selector 420 may be bidirectional. The main link Lane 0 differential pair of the DP port of the function selector 420 may be an input when the DisplayPort function is a source and an output when the DisplayPort function is a sink. The HPD of the DP port of the function selector may be an output when the DisplayPort function is a source and an input when the DisplayPort function is a sink.

Figure 5:
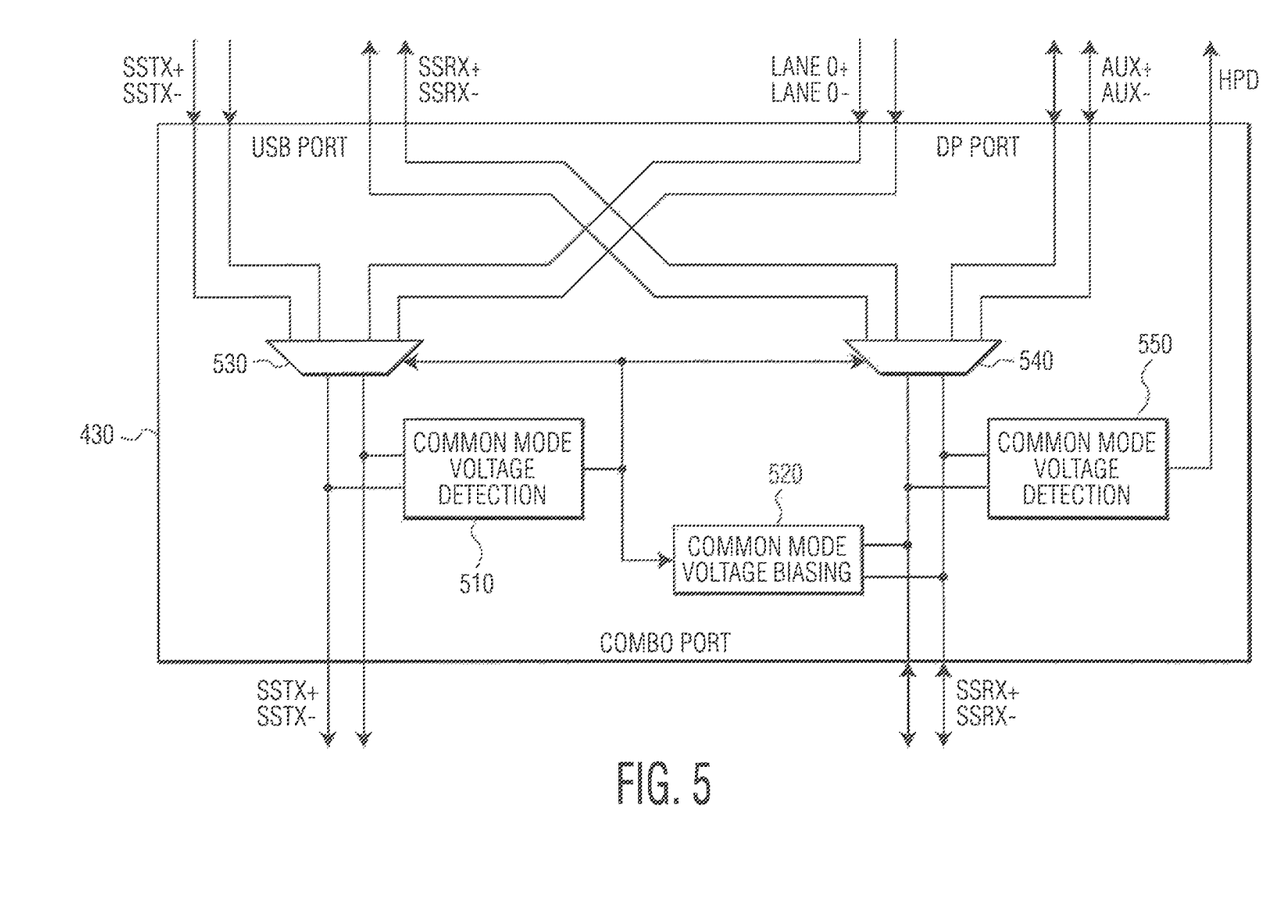
FIG. 5 illustrates the Function Selector in source mode.

FIG. 5 illustrates the Function Selector in source mode, i.e. when connecting to a DisplayPort source system that implements both a USB 3.0 and DisplayPort protocol over a USB 3.0 connection. The function selector 430 may include first switcher 530, second switcher 540, first common mode voltage detection device 510, second common mode voltage detection device 550, and a common mode voltage biasing device 520. The first switcher 530 may be connected to the SSTX differential pair of the USB SuperSpeed controller 416 and to the Lane 0 differential pair of the DisplayPort source 420 and the SSTX differential pair of the USB 3.0 receptacle 440. The second switcher 540 may be connected to the SSRX differential pair of the USB SuperSpeed controller 416 and to the AUX differential pair of the DisplayPort source 420 and the SSRX differential pair of the USB 3.0 receptacle 440. The first common mode voltage detection device 510 may be connected to the SSTX differential pair of the USB 3.0 receptacle 440. A second common mode voltage detection 550 may be connected to the SSRX differential pair of the USB 3.0 receptacle 440. The common mode voltage biasing device 520 may be also connected to the SSRX differential pair of the USB 3.0 receptacle 440.

The operation of the function selector 430 when implemented in a DisplayPort source will now be described. The function selector 430 may detect the common mode voltage of the SSTX differential pair of the receptacle with the common mode voltage detection 510. If the voltage level is close to 0.0V, the attached function may be SuperSpeed. If the voltage level is High (equivalent to Vbias_Rx, but with a minimum value greater than detection threshold voltage), the attached function may be the Combo data lane. Therefore, if the common mode voltage of the SSTX differential pair of the receptacle is below a detection threshold voltage, the function selector 430 may connect the SuperSpeed TX differential pair from the USB Port to the SSTX differential pair of the Combo port and the SSRX differential pair from the Combo port to the SuperSpeed RX differential pair of the USB Port. Otherwise, if the common mode voltage of the SSTX differential pair of the receptacle is above the detection threshold voltage, the function selector 430 may connect the Lane 0 differential pair from the DP Port to the SSTX differential pair of the Combo port and the AUX differential pair from the DP Port to the SSRX differential pair of the Combo port, i.e., Combo mode. In the Combo mode, the function selector 430 may bias the SSRX differential pair of the Combo Port with the common mode voltage biasing 520 to have a high common mode voltage level above the detection threshold voltage, to activate the detection of the Combo mode on the device with DisplayPort sink function. This high level biasing may be weak to permit a pull-down of the common mode voltage level below the detection threshold voltage by the function selector 430 of the device with DisplayPort sink function in order to transmit a HPD low level pulse.

The function selector 430 may generate an HPD signal on its DP port according the common mode voltage of the SSRX differential pair of the Combo port with the common mode voltage detection 550. If the common mode voltage of SSRX differential pair is below the detection threshold voltage, then HPD is output at a low level (below hot unplug detection threshold, e.g., 0.8V). If the common mode voltage of the SSRX differential pair is greater than the detection threshold voltage, then HPD may be output at a high level (above hot plug detection threshold, e.g., 2.0V).

Because a DisplayPort sink may generate a short low going pulse (0.5 to 1.0 ms) on the HPD line for an interrupt request (IRQ) to the source, the function selector 430 may maintain the Combo mode when the common mode voltage of SSRX differential pair is below the detection threshold voltage for a period shorter than the IRQ HPD pulse detection threshold (e.g., 2.0 ms).

If the device is connected to a device with USB SuperSpeed function only (not Combo mode), the common mode voltage level of the SSTX differential pair of the receptacle is always below the detection threshold voltage, so the function selector is always in the SuperSpeed mode. In the same time, the common mode voltage level of the SSRX differential pair of the receptacle is always below the detection threshold voltage, so the HPD signal output to the DisplayPort part is always Low.

Figure 6:
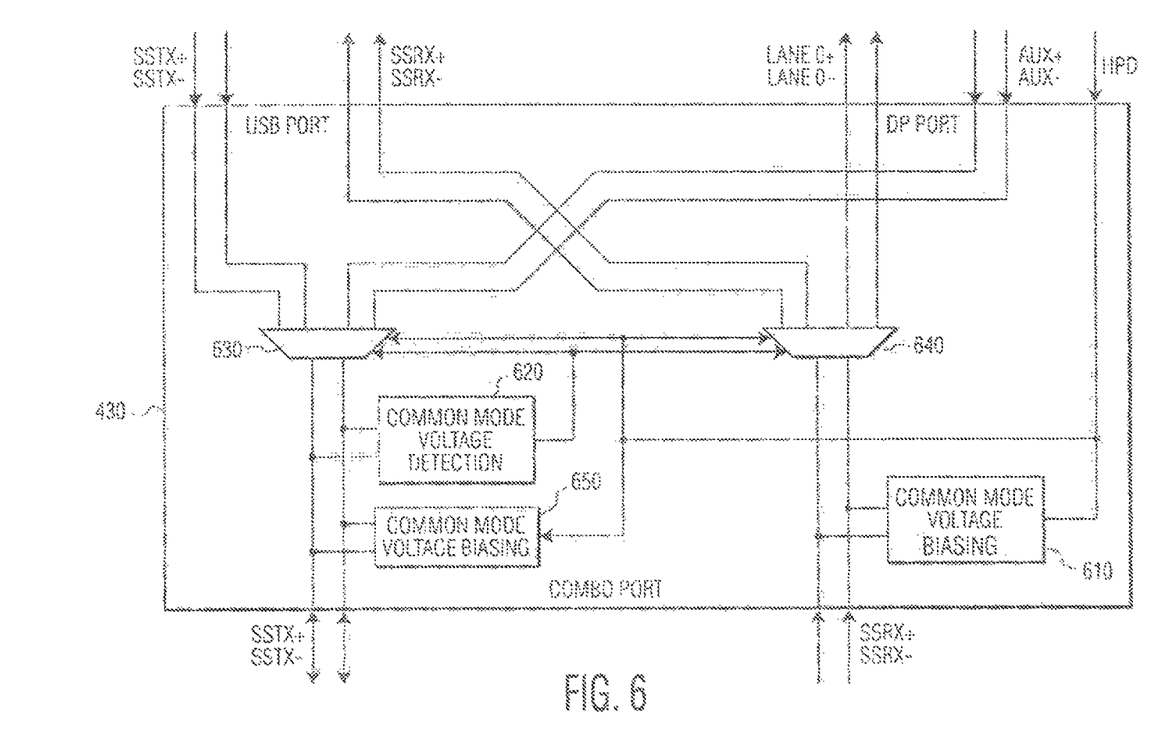
FIG. 6 illustrates the Function Selector in sink mode.

FIG. 6 illustrates the Function Selector in sink mode, i.e. when connecting to a DisplayPort sink system that implements both a USB 3.0 and DisplayPort protocol over a USB 3.0 connection. The function selector 430 may include first switcher 640, second switcher 630, a common mode voltage detection device 620, first common mode voltage biasing device 610, and second common mode voltage biasing device 650. The first switcher 640 may be connected to the SSRX differential pair of the USB SuperSpeed controller 416 and to the Lane 0 differential pair of the display port sink 420 and the SSRX differential pair of the USB 3.0 receptacle 440. The second switcher 630 may be connected to the SSTX differential pair of the USB SuperSpeed controller 416 and to the AUX differential pair of the display port sink 420 and the SSTX differential pair of the USB 3.0 receptacle 440. The first common mode voltage biasing device 610 may be connected to the SSRX differential pair of the USB 3.0 receptacle 440. A second common mode voltage biasing device 650 may be connected to the SSTX differential pair of the USB 3.0 receptacle 440. The common mode voltage detection device 620 may be also connected to the SSTX differential pair of the USB 3.0 receptacle 440.

The operation of the function selector 430 when implemented in a DisplayPort sink will now be described. The function selector 430 may select the mode according the voltage level of incoming HPD signal from the DisplayPort controller 420. The function selector also may detect the common mode voltage of the SSTX differential pair of the receptacle 440 with the common mode voltage detection 620 to activate or not activate the DP port. Therefore, if the voltage level of HPD is low (below hot unplug detection threshold, e.g., 0.8V), the function selector 430 may connect the SuperSpeed TX differential pair from the USB Port to the SSTX differential pair of the Combo port and the SSRX differential pair from the Combo port to the SuperSpeed RX differential pair of the USB port, i.e., SuperSpeed mode. In the SuperSpeed mode, the function selector 430 may bias the SSRX differential pair of the Combo port to have a common mode voltage level below the detection threshold voltage, according the single-ended voltage levels of SuperSpeed signals.

Otherwise, if the voltage level of HPD is high (above the hot plug detection threshold, e.g. 2.0V), the function selector may bias the SSRX differential pair of the Combo port with the first common mode voltage biasing device 610 to have a high common mode voltage level above the detection threshold voltage in order to activate the detection of the Combo mode on the device with the DisplayPort source function.

If the voltage level of HPD is high (above hot plug detection threshold, e.g., 2.0V) and the common mode voltage of the SSTX differential pair of the receptacle 440 is above the detection threshold voltage, the function selector 403 may connect the SSRX differential pair from the Combo port to the Lane 0 differential pair of the DP Port and the AUX differential pair from the DP port to the SSTX differential pair of the Combo port, i.e., Combo mode.

If the voltage level of HPD is high (above hot plug detection threshold, e.g., 2.0V), but the common mode voltage of the SSTX differential pair of the receptacle 440 is below the detection threshold voltage, the function selector 430 may not connect the SSTX and SSRX differential pairs from the Combo port to the DP port nor the USB port (Idle mode).

In the Combo mode, the function selector 430 may bias the SSTX differential pair of the Combo port with the common mode voltage biasing 650 to have a low common mode voltage level (below the detection threshold voltage) when the HPD signal from DisplayPort controller 420 is low.

Because a DisplayPort sink may generate a short low going pulse (0.5 to 1.0 ms) on HPD line for an interrupt request (IRQ) to the source, the function selector 420 may maintain the Combo mode when the HPD signal from the DisplayPort controller 420 becomes low for a period shorter than the IRQ HPD pulse detection threshold (e.g., 2.0 ms).

If the device is connected to a device with USB SuperSpeed function only (not Combo mode), the common mode voltage level of the SSTX differential pair of the receptacle is always below the detection threshold voltage, so the Function Selector is always in the SuperSpeed mode or the idle mode. Accordingly, there may be no risk of conflict between DisplayPort and SuperSpeed transmission. In the idle mode when HPD is High, SuperSpeed is not available because USB SuperSpeed controller 416 is not connected.

If the DisplayPort sink device with the function selector is connected to a device with USB SuperSpeed function only (not Combo mode), the high common mode voltage level applied on the SSRX differential pair of the Combo port (when the voltage level of HPD is high) may be blocked by the mandatory decoupling AC capacitors on the SuperSpeed transmitter, so there is no risk of damage to the USB SuperSpeed device.

Figure 7:
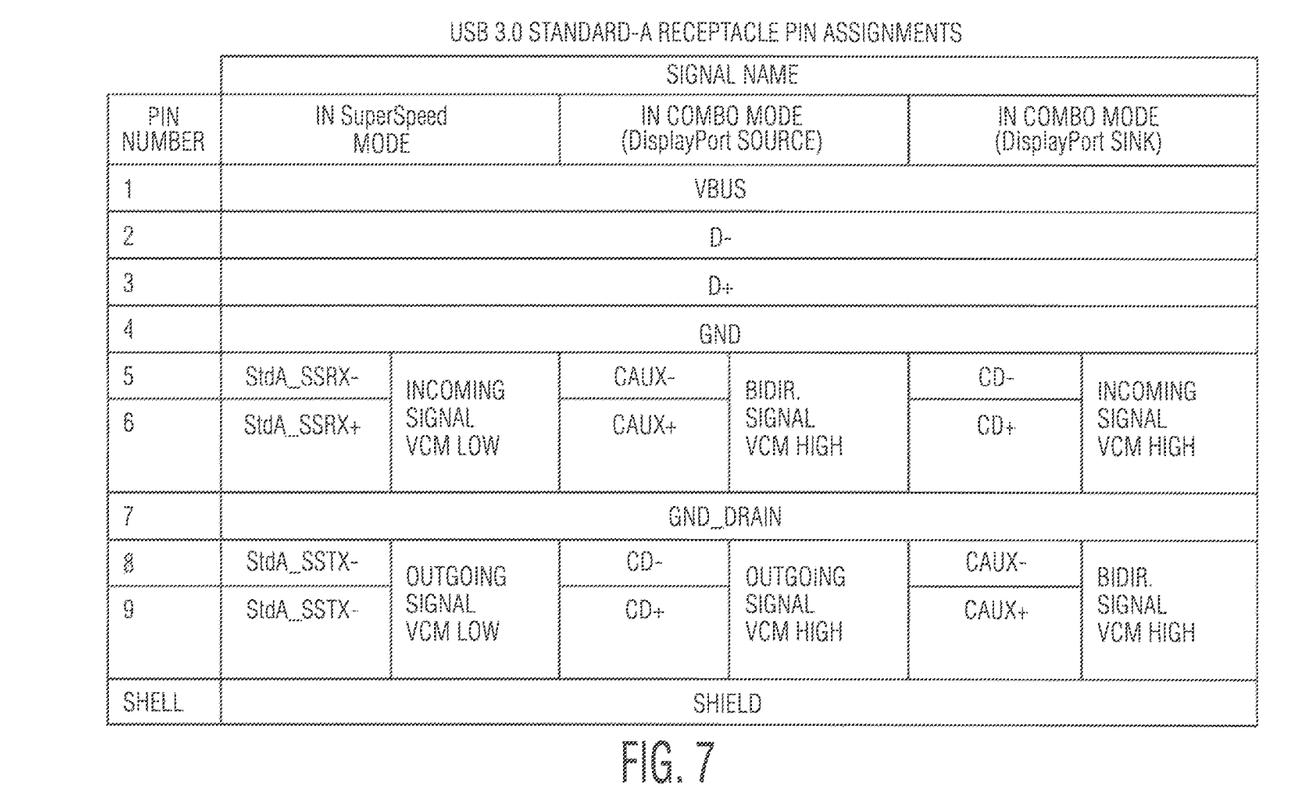
FIGS. 7 to 11 are tables illustrating the signals present on various USB pins depending upon the mode of operation.

FIGS. 7 to 11 are tables illustrating the signals present on various pins of USB 3.0 receptacles depending upon the mode of operation. For example, the table in FIG. 7 is for a USB 3.0 standard-A receptacle. The pins are listed in the first column. Then in the remaining columns three modes are illustrated: SuperSpeed; Combo mode for a DisplayPort source device; and Combo mode for a DisplayPort sink device. Pins 5 and 6 are the SSRX pins. In the SuperSpeed mode, pins 5 and 6 carry the standard SuperSpeed receive (SSRX) signals. The signal will be an incoming signal with common mode voltage (Vcm) being low. In the DisplayPort source Combo mode, pins 5 and 6 carry the Combo AUX (CAUX) signal which may be a bidirectional signal with Vcm high. In the DisplayPort sink Combo mode, pins 5 and 6 may carry the Combo data lane (CD) signal which may be an incoming signal with Vcm high. Pins 8 and 9 are the SSTX pins. In the SuperSpeed mode, pins 8 and 9 carry the standard SuperSpeed transmit (SSTX) signals. The signal will be an outgoing signal with Vcm being low. In the DisplayPort source Combo mode, pins 8 and 9 carry the CD signal which may be an outgoing signal with Vcm high. In the DisplayPort sink Combo mode, pins 8 and 9 carry the CAUX signal which may be a bidirectional signal with Vcm high.

Figure 8:
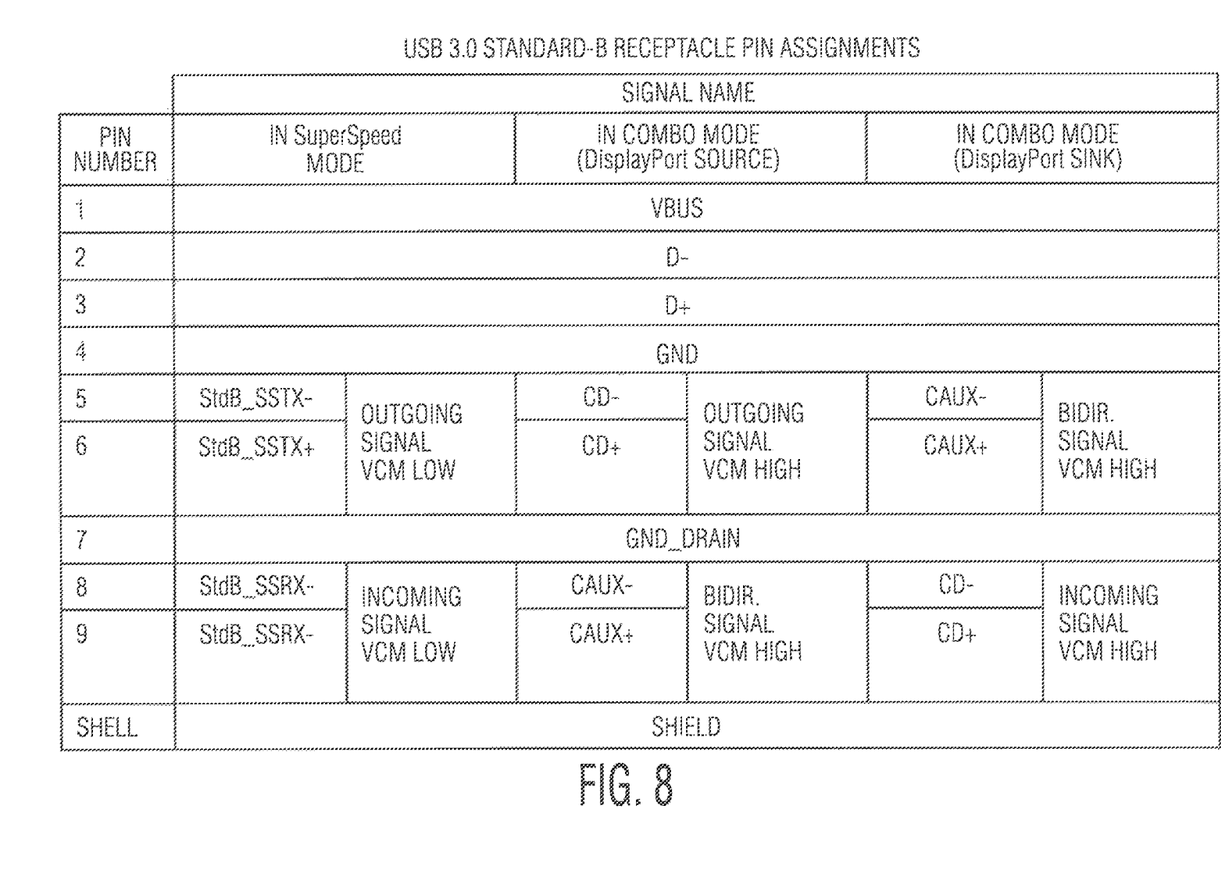
Figure 9:
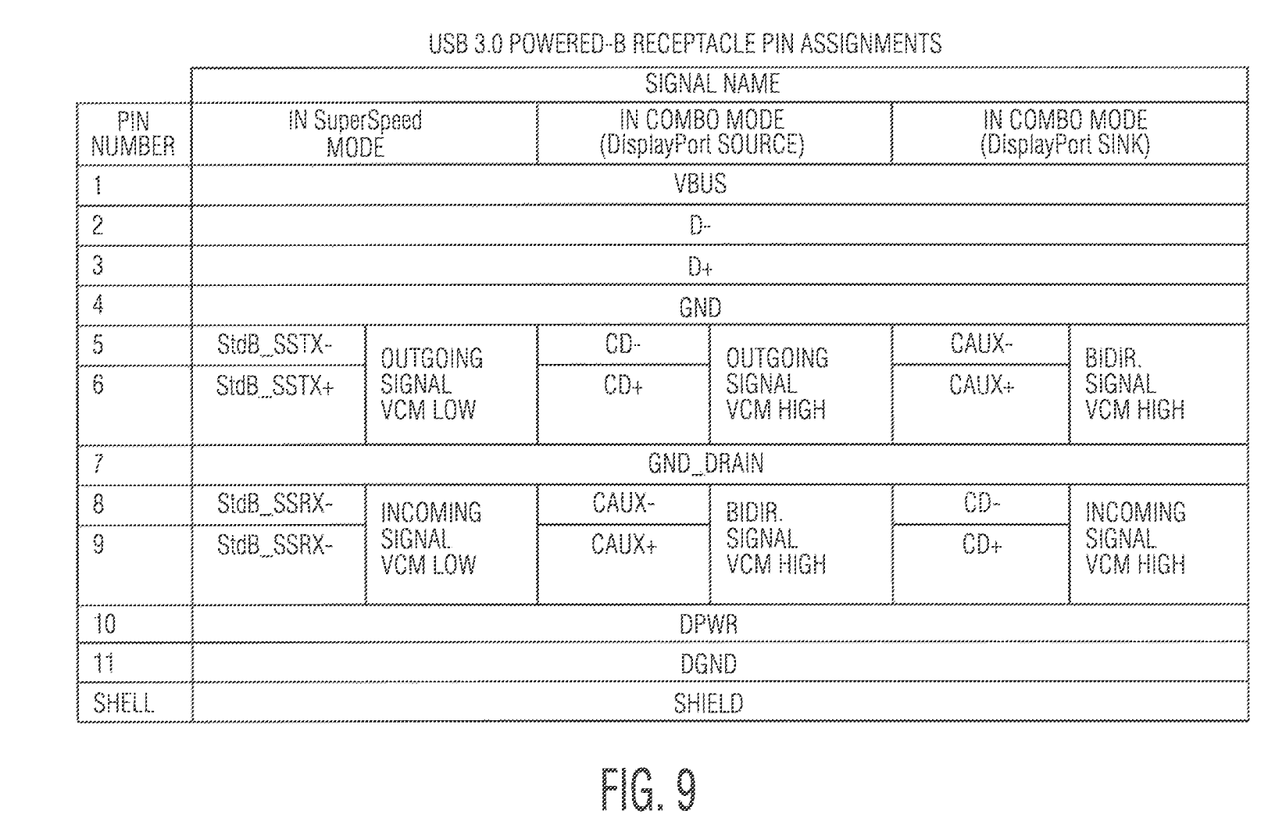
Figure 10:
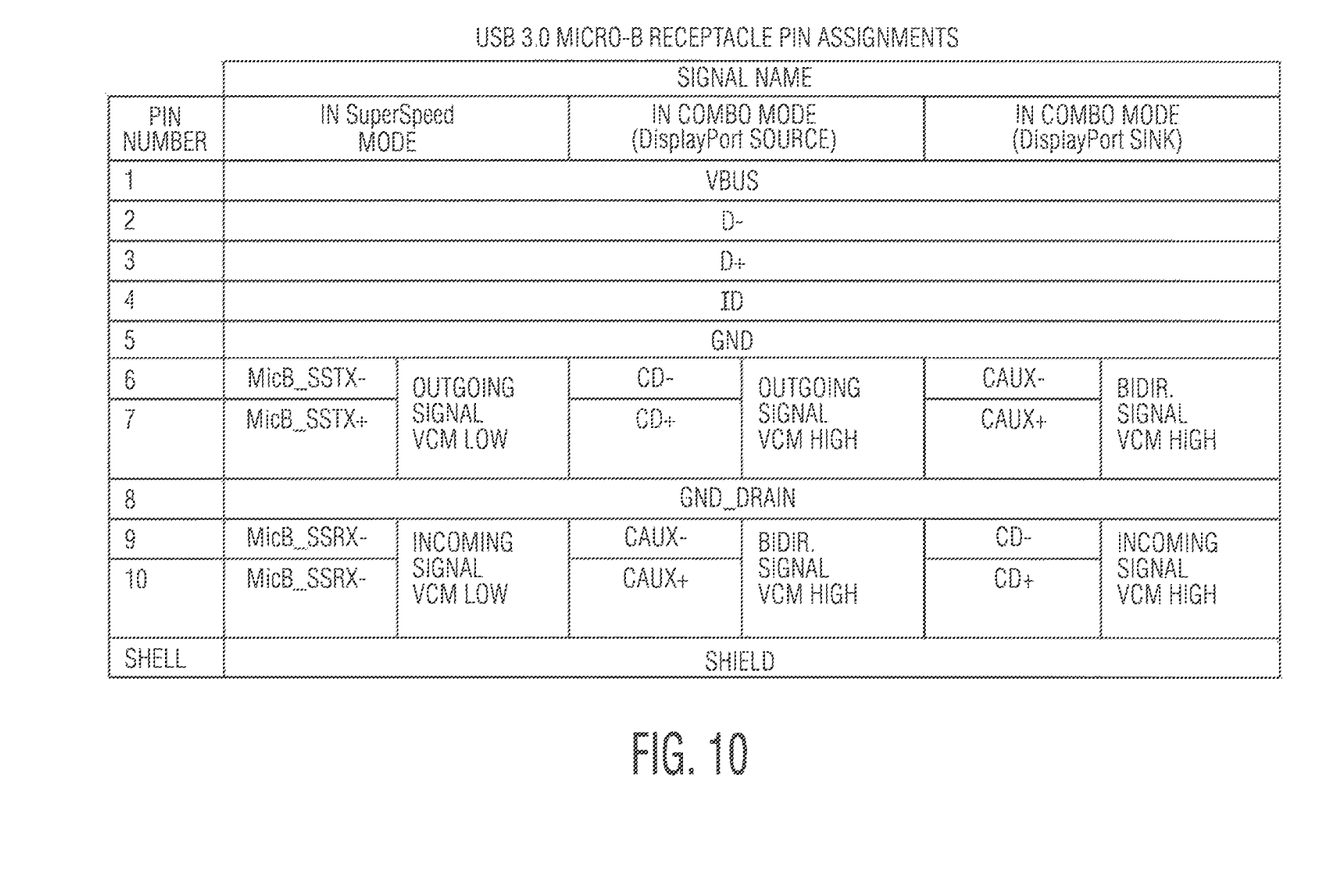
Figure 11:
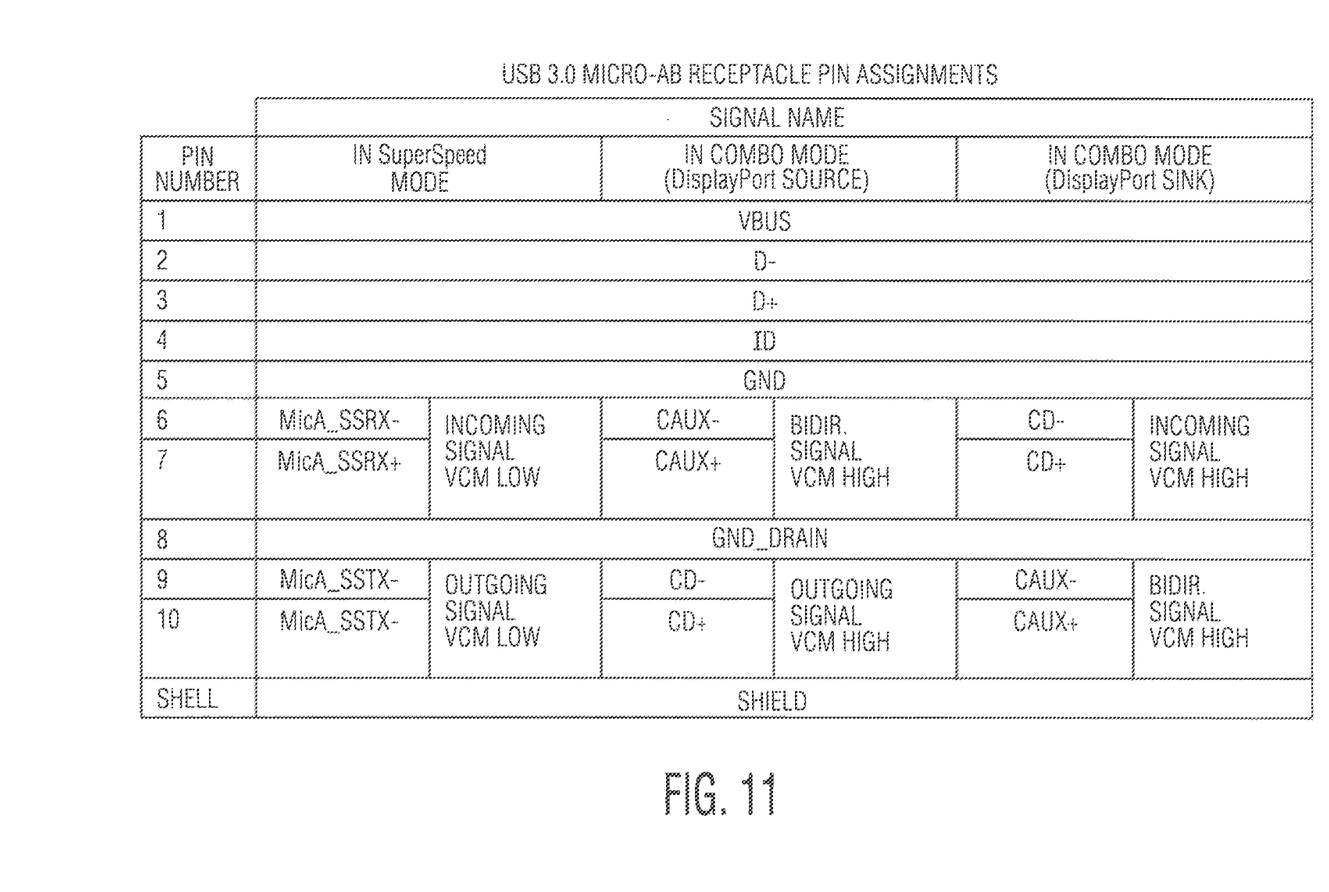

The table in FIG. 8 is for a USB 3.0 standard-B receptacle. The table in FIG. 0 is for a USB 3.0 Powered-B receptacle. The table in FIG. 10 is for a USB 3.0 Micro-B receptacle. The table in FIG. 11 is for a USB 3.0 micro-AB receptacle.

The function selector may be implemented in various systems and devices. Such systems and devices may include mobile devices, phones, tablets, music players. GPS receivers, video players, displays, televisions, monitors, keyboards, mice, track pads, and trackballs, etc.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A function selector device in a system using both a USB 3.0 protocol and a DisplayPort protocol over a universal serial bus (USB) mechanical interface, comprising:
    a first port configured to transmit/receive a USB SSTX signal;
    a second port configured to transmit/receive a USB SSRX signal;
    a third port configured to transmit/receive a DisplayPort lane signal;
    a fourth port configured to transmit/receive a DisplayPort AUX signal;
    a fifth port configured to transmit/receive a DisplayPort HPD signal;
    a sixth port configured to connect to SSTX pins of a USB 3.0 receptacle;
    a seventh port configured to connect to SSRX pins of the USB 3.0 receptacle; and
    a first switching circuit coupled to the first port and either the third port or the fourth port; and
    a second switching circuit coupled to the second port and either the third port or the fourth port,
    wherein the function selector device is configured to selectively share the USB and DisplayPort signals with the USB 3.0 receptacle, and communicate DisplayPort traffic simultaneously with the communication of lower USB traffic from a USB controller.

2. The function selector device of claim 1,
    wherein the seventh port is configured to transmit the DisplayPort AUX signal received at the fourth port.

3. The function selector device of claim 2,
    wherein the seventh port is configured to transmit the DisplayPort HPD signal received at the fifth port.

4. The function selector device of claim 1,
    wherein the function selector device is configured to determine that a voltage at the sixth port is below a detection threshold voltage, connect the first port to the sixth port, and connect the second port to the seventh port.

5. The function selector device of claim 1,
    wherein the function selector device is configured to determine that a voltage at the sixth port is above a detection threshold voltage, connect the third port to the sixth port, and connect the fourth and fifth ports to the seventh port.

6. The function selector device of claim 1,
    wherein the function selector device is configured to determine that a voltage at the fifth port is below a hot plug detection threshold voltage, connect the first port to the sixth port, and connect the second port to the seventh port.

7. The function selector device of claim 1,
    wherein the function selector device is configured to determine that a voltage at the fifth port is above a hot plug detection threshold voltage, connect the third port to the seventh port, and connect the fourth and fifth ports to the sixth port.

8. A system including the function selector device of claim 1,
    wherein the system is one of a display, television, monitor, keyboard, mouse, track pad, trackball, a phone, tablet, music player, GPS receiver, and video player.

9. A function selector device in a system using both a USB 3.0 protocol and a DisplayPort protocol over a universal serial bus (USB) mechanical interface, comprising:
    a first port configured to transmit/receive a USB SSTX signal;
    a second port configured to transmit/receive a USB SSRX signal;
    a third port configured to transmit/receive a DisplayPort lane signal;
    a fourth port configured to transmit/receive a DisplayPort AUX signal;
    a fifth port configured to transmit/receive a DisplayPort HPD signal;
    a sixth port configured to connect to SSTX pins of a USB 3.0 receptacle;
    a seventh port configured to connect to SSRX pins of the USB 3.0 receptacle; and
    a first switching circuit coupled to the first port and the third port; and
    a second switching circuit coupled to the second port and the fourth port,
    wherein the function selector device is configured to share the USB and DisplayPort signals with the USB 3.0 receptacle, and communicate DisplayPort traffic in parallel with the communication of lower USB traffic from a USB controller.

10. A function selector device in a system using both a USB 3.0 protocol and a DisplayPort protocol over a universal serial bus (USB) mechanical interface, comprising:
    a first port configured to transmit/receive a USB SSTX signal;
    a second port configured to transmit/receive a USB SSRX signal;
    a third port configured to transmit/receive a DisplayPort lane signal;
    a fourth port configured to transmit/receive a DisplayPort AUX signal;
    a fifth port configured to transmit/receive a DisplayPort HPD signal;
    a sixth port configured to connect to SSTX pins of a USB 3.0 receptacle;
    a seventh port configured to connect to SSRX pins of the USB 3.0 receptacle; and
    a first switching circuit coupled to the first port and the fourth port; and
    a second switching circuit coupled to the second port and the third port,
    wherein the function selector device is configured to share the USB and DisplayPort signals with the USB 3.0 receptacle, and communicate DisplayPort traffic in parallel with the communication of lower USB traffic from a USB controller.

* * * * *